United States Patent
Rhoads

(10) Patent No.: US 9,460,505 B2
(45) Date of Patent: Oct. 4, 2016

(54) DETECTION OF WEAK SPECKS FROM IMAGERY

(71) Applicant: Digimarc Corporation, Beaverton, OR (US)

(72) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 67 days.

(21) Appl. No.: 14/466,869

(22) Filed: Aug. 22, 2014

(65) Prior Publication Data

US 2015/0055837 A1 Feb. 26, 2015

Related U.S. Application Data

(60) Provisional application No. 61/871,772, filed on Aug. 29, 2013, provisional application No. 61/868,925, filed on Aug. 22, 2013, provisional application No. 61/874,790, filed on Sep. 6, 2013.

(51) Int. Cl.
    G06K 9/46    (2006.01)
    G06T 7/00    (2006.01)

(52) U.S. Cl.
    CPC ........... *G06T 7/0012* (2013.01); *G06K 9/4604* (2013.01); *G06K 9/4638* (2013.01); *G06T 2207/10032* (2013.01); *G06T 2207/30096* (2013.01)

(58) Field of Classification Search
    None
    See application file for complete search history.

(56) References Cited

U.S. PATENT DOCUMENTS

| | | | |
|---|---|---|---|
| 6,483,927 B2 | 11/2002 | Brunk | |
| 6,580,809 B2 | 6/2003 | Stach | |
| 6,590,996 B1 | 7/2003 | Rhoads | |
| 6,631,198 B1 | 10/2003 | Bradley | |
| 6,724,914 B2 | 4/2004 | Brundage | |
| 7,076,082 B2 | 7/2006 | Sharma | |
| 7,231,061 B2 | 6/2007 | Bradley | |
| 7,688,996 B2 | 3/2010 | Bradley | |
| 2010/0165158 A1 | 7/2010 | Rhoads | |
| 2010/0325117 A1 | 12/2010 | Sharma | |
| 2014/0029809 A1 | 1/2014 | Rhoads | |

OTHER PUBLICATIONS

Hashimoto, Noriaki, et al. "Referenceless image quality evaluation for whole slide imaging." Journal of pathology informatics 3 (2012).*
Bhat, Pravin, et al. "Gradientshop: A gradient-domain optimization framework for image and video filtering." ACM Transactions on Graphics (TOG) 29.2 (2010): 10.*
Gonzalez, Rafael C., and E. Richard. "Woods, digital image processing." ed: Prentice Hall Press, ISBN 0-201-18075-8 (2002).*

* cited by examiner

*Primary Examiner* — Bhavesh Mehta
*Assistant Examiner* — Menatoallah Youssef
(74) *Attorney, Agent, or Firm* — Digimarc Corporation

(57) ABSTRACT

Discerning small, weak features ("specks") from imagery can be critical in early-stage cancer detection and other applications. In one aspect, the presence of a speck is judged from a large set of "votes" about whether a point in the imagery has a value above or below its neighbors. Hundreds or thousands or more votes can be gathered from one or more images, to thereby—in the aggregate—tend to confirm or refute the presence of a speck at a particular location. Votes can be based on simple pixel differences, e.g., between a pixel at the center of a 7×7 pixel image excerpt, and each of 48 other pixels in the excerpt. More sophisticated methods can employ analyses of triads, quads, and rings, and kernel-based Markov Random Field frameworks, to roll-up to a final conclusion. A great number of other features and arrangements are also detailed. The technology is particularly illustrated in the context of detecting exoplanets from astronomical imagery of remote star systems.

17 Claims, 10 Drawing Sheets

DOMINANT GRADIENT – LIKELY DUE TO HOST STAR OR OTHER NOISE SOURCE – MOSTLY NOT THE SIGNAL WE WANT

| 240 | 242 | 239 |
|-----|-----|-----|
| 220 | 219 | 221 |
| 200 | 202 | 201 |

THESE VARIATIONS ARE MORE LIKELY DUE TO THE WEAK SIGNAL WE ARE LOOKING FOR $$\text{Waxel Sample Value} = \sum_{r=1}^{R} w_r \cdot \int_0^{2PI} \text{sign}(A - B_\Theta) \, d\Theta$$

$$\sum_{i=1-8} \text{sign}(A - B_i) \quad + \quad \sum_{k=1-8} \text{sign}(A - B_k)$$

Integer Pixel Oct-Axis

DETECTION OF WEAK SPECKS FROM IMAGERY

RELATED APPLICATION DATA

This application is a non-provisional of U.S. Applications Nos. 61/871,772, filed Aug. 29, 2013, 61/868,925, filed Aug. 22, 2013, and 61/874,790, filed Sep. 6, 2013. The first two of these applications—including their appendices—are incorporated herein by reference, in their entireties.

Reference to Computer Program Listing Appendix

Computer program listing appendices are submitted herewith on one compact disc and one duplicate compact disc. The total number of compact discs including duplicates is two. The files on the compact discs are Matlab computer program files, presented as ASCII text files. Their names, dates of creation, directory locations, and sizes in bytes are:

BatchOpt11.txt, dated Jun. 20, 2016, and of length 9 Kbytes;

ExoCrunchv22.txt, dated Jun. 20, 2016, and of length 31 Kbytes;

ExoS2N_Crunchv2.txt, dated Jun. 20, 2016, and of length 6 Kbytes;

MakeMask.txt, dated Jun. 20, 2016, and of length 2 Kbytes; and

RingRing_RingSearchv10.m, dated Jun. 20, 2016, and of length 23 Kbytes.

The above computer program listings were submitted as part of the application's original typed text, as an appendix. The typed text files have been replaced with the referenced compact disc versions, in compliance with 37 CFR 1.96 and 1.52(e). These computer program listings are incorporated herein by reference.

FIELD OF TECHNOLOGY

The present technology concerns weak signal detection, and is particularly useful in discerning small, almost point source-like features ("specks") in imagery.

BACKGROUND

The need to extract weak signals from imagery is an impediment to many technical efforts. Prime examples include identifying nascent cancers and cancerous precursors in medical imagery (both 2D and 3D), and exoplanet detection.

In an effort to advance the weak signal extraction field, researchers at leading exoplanet efforts gathered in 2012 to collaborate. Information from the meeting is published in Lawson et al, On advanced estimation techniques for exoplanet detection and characterization using ground-based coronagraphs, SPIE Astronomical Telescopes+Instrumentation, pp. 844722-844722, 2012. A related PowerPoint presentation was delivered at the 2012 SPIE Adaptive Optics Systems III conference. Both the paper and the PowerPoint presentation are attached to application 61/871,772. Among the researchers' efforts was publication by Poyneer, et al, of a suite of simulated speckle data (the NAKFI data), on which different techniques could be tried. Such data is publicly available at http://olbin<dot>jpl<dot>nasa<dot>gov/nakfi, in the form of 100 compressed (.tar) fits files—each corresponding to an hour's worth of observations, as more fully detailed in the Lawson paper. (Fits is a standard data format used in astronomy: Flexible Image Transport System.)

The challenge of finding exoplanets in astronomical imagery is extreme. The planets are dimmer, by a factor of $10^4$-$10^{12}$, than the stars that they orbit. The angular resolution of even the best contemporary telescopes is modest compared to the scales involved—scales which are generally finer than one arc second of separation between a star and a planet and most often below one tenth of an arc second for stars further away than ten or twenty parsecs. And the speckling phenomena introduced by atmospheric seeing effects causes artifacts that, on first impression, resemble planets.

Applicant has developed techniques that are believed to advance the state of the art in discerning small, exceedingly weak image features. Some of these techniques rely on sensing myriad image gradients, through use of non-linear filtering methods, to look for very tiny biases which a dim companion planet causes to otherwise star-dominant data.

In one exemplary embodiment, the presence or absence of an exoplanet is judged from a large set of "votes" about whether a point in the imagery has a value above or below its neighbors. Hundreds or thousands or more votes can be gathered from one or more images, to thereby—in the aggregate—tend to confirm or refute the presence of an exoplanet at a particular location. Votes can be based on simple pixel differences, e.g., between a pixel at the center of a 7×7 pixel image excerpt, and each of 48 other pixels in the excerpt. More sophisticated methods employ analyses of triads, quads, and rings, and kernel-based Markov Random Field frameworks, to roll-up to a conclusion.

The foregoing and additional features and advantages of the present technology will be more readily apparent from the following Detailed Description, which proceeds with reference to the accompanying drawings.

DETAILED DESCRIPTION

Figures 1, 2:
FIG. 1 shows an exemplary 7×7 pixel excerpt, from a larger image frame.
FIG. 2 shows a 3×3 pixel excerpt.

To best understand the present technology, it is helpful to first understand a predecessor technology, "oct-axis" filtering.

"Oct-axis" filtering is used by applicant in its commercial digital watermarking products, to enhance recovery of weak digital watermark signals from imagery. Such filtering employs the template form of a classic Laplacian edge-enhancing filter, being a 3 by 3 kernel with a central '8' surrounded by 8–1's. Oct-axis filtering takes this classic filter and first splits it up into 8 pairwise relationships, i.e. 8 pairs of +1/−1 relationships between the central pixel and each of its eight neighbors. They become 8 independent operations. In spread spectrum-based digital watermark communication, 'chips' are used to impress either a negative or positive tiny signal onto any given point in an image. The hypothesis of a negative or a positive chip being present at some given location is then tested using the oct-axis filter through a simple polarity test, i.e., which brightness value is higher. The higher of the pair then accumulates a discrete positive 'vote' +1 for some ultimate message hypothesis, and the lower pixel receives a discrete negative 'vote' −1. This operation is applied to the entire image —$10^5$ to $10^6$ operations against a 56-bit hypothesis (the payload of the subject watermark) —and then that filtered image is submitted to secondary and tertiary stages in the decoding process. Oct-axis filtering is typically used in these later stages as well, especially in the scaled/rotated final decoding stage where straightforward spread spectrum decoding methods are applied. Numerous studies over the years reinforce the idea that this simple filter is an optimal one for weak signal enhancement in non-Gaussian distortion and general ignorance of channel properties. Weightings of these filter outputs are quite possible given any kind of additional information about a channel (JPEG compression, for example, is considered a common 'channel' and therefore there are various tuning options available to modify the filters accordingly).

Applications such as exoplanet detection have access to orders of magnitude larger CPU-time resources and to significantly more information about 'the channel'. The hypothesis testing in the case of exoplanets becomes a similar Bayesian yes or no test for presence or absence of a signal at all candidate locations. The case of exo-disk imaging is also similar, effectively rephrasing the tests to looking for edges and contrast differences between neighboring regions.

The oct-axis filter is based on a filter whose output has been shown to be a Locally Most Powerful (LMP) test statistic for detection of signals within a simple Markov Random Field (MRF) with Laplacian marginals, representative of the distributions seen in watermark detection. The voting principles of the oct-axis filter can be generalized to perform well on the distributions applicable to direct observation of exoplanets. Such generalizations of oct-axis fit into a kernel-based Markov Random Field framework describing what are effectively local differential photometric relationships amongst data. These relationships at first can be coarsely and/or theoretically estimated, but ultimately are more 'learned' in the multivariate situation of a large adaptive-optic, coronagraphic data collection set-up in ever-varying atmospheric scintillation conditions. This learning can be systematically captured through each and every new successful detection adding to a maintained training data set, a set to that can be used to improve the numerous discrete and continuous 'switches and dials' that reside in the weighting mathematics.

Principles of operation similar to oct-axis can thus be used, setting up local differential photometric comparison tests and producing +1/−1 answers. Basic bias estimation methods can applied during this lowest-level comparison process. As detailed below, there are various opportunities to apply weighting to these votes, including brightness (shot noise), image gradient magnitude (a rough measure of residual speckle), and what we call 'cross-gradient' weighting, where in the large distortion assumption, the specific peaks and valleys of image data can be exploited in terms of weighting votes based on orientation A particular embodiment employing aspects of the present technology formulates exoplanet spectroscopy via terrestrial interferometry as a spread spectrum communications problem (as opposed to a conventional star/exoplanet signal separation problem). Non-linear filtering techniques are employed, where noise and distortion on a channel are several orders of magnitude higher than the extremely weak signals being measured, and where one must utilize noise/distortion prone measuring devices.

Having some knowledge of the noise/distortion on a channel, e.g. a parent star's inherent spectral signature, allows further levels of contrast between extremely weak signals and ambient overlapping channel noise. Parent stars around exoplanets take on a double edged sword character: representing the known nasty edge of a $10^4$ through $10^{12}$ class channel noise source relative to weak exoplanet signals, but that same parent star becomes a critically helpful second edge, being the guide star which drives the channel modeling within a spread spectrum framework. Adaptive optic telescopes replete with coronograph star-nulling arrangements know this double edged sword well. $5^{th}$ to $10^{th}$ magnitude stars are more than sufficiently bright to serve this latter guide star function in non-adaptive optic situations, as this is performed as a data reduction operation, not needing to drive adaptive optic actuators.

A highly simplified phase-isoplanatic arrangement is first developed to get basic ideas in place, followed by a more realistic (and so-called) Tatarskii/Wheelon Channel Model, itself having the interesting property that highly off-zenith stars provide more orthogonality (largely anisoplanatism of both phase and amplitude) between parent and exoplanet signal coding, to use spread spectrum vernacular. A highly nominal fiber-based interferometric collection set-up may be used as but one of many possible spectroscopically-enabled data collection approaches.

Orthogonality of coding is an important spread spectrum detection concept, and the 1 kHz changes induced by the turbulent atmosphere provide a constant source of channel dynamics. Measurement and modeling of this roiling channel becomes the central challenge, but also the key opportunity, for approaching spectral measurements of the extremely weak ~$30^{th}$ magnitude class exoplanet light. One aspect of this work, then, is the mapping of mature spread spectrum practices onto the equally mature understandings and measurement practices of interferometric spectroscopy and of EM scintillation through a turbulent atmosphere. (A local Morse pattern comparison can be made between the modeled star and the 'sought' exoplanet 2D speckles. The chip sequence of the exospeckles changes 1000 times per second but the exact code locations aren't known without the star's measurement of the instantaneous atmosphere. Advanced wavefront sensing if you will.)

Certain of applicant's techniques disclosed herein have been implemented in three Matlab files: BatchOpt11.txt, exoCrunchv22.txt, and exoS2N_Crunchv2.txt, which are attached in an appendix to the present application. (Matlab file makeMask.txt is also attached, and masks out inner and outer garbage in the simulated data.)

As noted, the NAKFI data set includes 100 simulated star studies. Each includes 600 images (i.e., 60,000 images in total). The file BatchOpt11 serves as an input processor—stepping through these 100 file archives, and making the component image data available to the program exoCrunchv22.m.

The program exoCrunchv22.m performs non-linear filtering and other processing, applying such techniques to a single set of 100 images.

The program exoS2N_Crunch is a statistics checker—comparing results from the exoCrunchv22 program with the reference results provided in the NAKFI data.

The methods implemented by this code are characterized by:

7 by 7 neighborhood ('48 gradients per pixel') polarity checking logic;
Signal level weighting via expected signal;
Noise level estimation via brightness only;
Grouping of the 48 gradients into independent weightings;
A crude 'channel model' producing a 'polarity bias' frame for every pixel and every gradient; and
Cross-gradient weighting (selected by a software switch).
The following discussion elaborates on these concepts.

FIG. 1 shows an exemplary 7×7 pixel excerpt, from a larger image frame (which may be, e.g., 256×256 pixels). To yield a processed pixel value for the center square "Y," 48 gradients can be considered, i.e., respectively between each of the other 48 pixels, and the center pixel—a few are shown by bold arrows. Each gradient is characterized by an orientation angle. Each also has a value, based on the difference in values between the center pixel and the pixel at the other end of the gradient. Thus, if pixel A has a value of 180, and pixel Y has a value of 215, then the gradient {A-Y} has a value of +35. Each gradient casts a vote towards the value of the center pixel "Y." If the gradient value is positive, it casts a vote of "1;" if the gradient value is negative, it casts a vote of −1. (A zero gradient casts a vote of 0.) Summing the 48 votes yields a processed pixel value for the center square "Y." Applied in like fashion to all the 7×7 patches in the imagery, this procedure yields a filtered image (which may be regarded as a Morse structure).

The attached code takes a variety of other factors into account in establishing—and weighting—the gradients' votes. For example, information may be known about the channel through which the signal is passing before it gets sensed, and this channel information may suggest certain biases that we expect to observe in the gradients. The gradients can be adjusted to reflect these expected biases.

For example, many of the telescopes used in exoplanet studies employ adaptive optic systems, which dynamically re-shape the mirror or other component(s) in subtle ways to counteract detected error sources (e.g., atmospheric turbulence). Yet such corrections are imperfect and exhibit slight temporal delays. Such factors give rise to residual error. Based on data from a wavefront sensor, or from frames earlier- or later-in the observation sequence, estimates of the point spread function can be made. This information suggests certain artifacts which may appear in the imagery; the gradients can be adjusted in response.

Similarly, information may be known that some photodetector cells in the sensor array have higher gains, or offsets, than other photodetectors. Most such error sources are normalized through corrective signal processing, but to the extent any remains, such information can be factored into the gradients involving such pixel(s).

Gradients can also be assessed for their likely signal-to-noise relevance, or other metric about their quality. Consider FIG. 2, which shows a 3×3 image excerpt, including values for the component pixels. As can be seen, across each row there is a small variation in value. However, going down through the rows evidences larger changes in values—in a consistent pattern that suggests a strong factor is at work (e.g., a gradient due to the host star, or other source that is "noise" for the present purposes; in the digital watermarking world—another realm dependent on weak signal detection—this would most likely be interference from the host image in which the watermark is embedded). Accordingly, gradients may be weighted based on their angle, relative to the dominant gradient angle evident in the image patch. In this example, those gradients that are vertically-oriented are given the least weight; and/or those that are horizontally-oriented are given the most weight (with intermediate orientations given intermediate weights). Such weighting can yield non-integer votes.

(It will be recognized that the gradients will rarely be vertical and horizontal. Moreover, in some cases, the gradient of minimum variability may not be orthogonal to the gradient of maximum variability.)

The just-described arrangement is termed "cross-gradient" weighting, and refers to giving large gradients that are consistently oriented throughout an image excerpt relatively less weight.

Techniques including the foregoing are implemented in the code exoCrunchv22.

Terrestrial telescopes typically keep the subject star centered in the field of view, by mechanical steering movement that follows the star's apparent trajectory across the sky. A further apparent rotation movement of the heavens around the tracked star is generally not mechanically redressed by the telescope (e.g., to limit introduction of mechanically-induced noise into the image). Thus, in observations over the course of an hour, exoplanets seem to move in orbital fashion around the star—reflecting the earth's rotation. (This motion is typically redressed in the image processing, which distills a set of images into a single result frame.)

While the exoCrunch code distills an hour of observations (600 images) into a single frame of result data, it may be preferable to generate plural frames of result data, e.g., one for each five minutes of observation (e.g., 50 component input images). The resulting 12 frames of data can then be rendered as a slow motion movie—allowing the viewer's human eye and brain to look for objects showing a consistent motion through the movie. (It will be recognized that such approach is akin to the work of Tombaugh, who discovered Pluto using a "blink comparator" method—rapidly shifting between views of the sky taken at different times, to allow the human visual system to discern differences.)

Processing the input image data, e.g., in five minute chunks, yields 12 images that have a lower signal-to-noise ratio than would result if the entire hour of input image data were processed into a single frame. However, presentation of these 12 images in sequence to a human observer allows the human's superior visual processing to be applied to discern faint objects that trace a tell-tale orbital path—indicating that they are not noise.

Attached to priority application 61/871,772 are images resulting from predecessor versions of the attached code, which processed the published NAKFI test data based on 3×3 and 5×5 neighborhoods, instead of 7×7. Note the enhancement in moving from 3×3 to 5×5 for the three illustrated cases (i.e., NAKFI data sets 4, 24 and 42).

Those images are followed by five images based on more recent work. The first two of these are raw coronagraphic image frames from the published NAKFI test data set #41—simulating 30 seconds exposure on the 8.5 meter diameter Gemini telescope on Mauna Kea. Buried inside the data are four planets, which are 'the challenge' to go hunt.

The next three images (Grad, Channel and Channel . . . overlay) are then reconstructions of an image after 600 instances of 30-second exposures, 5 spectral bands, over 1 hour of observing time. (Overlay shows where the 'known planted' planets are.)

This was a particularly challenging data set. One of the planets detected by applicant's code was not detected by the methods detailed in the Lawson et al paper.

Grad and Channel are basically the above-described core unweighted gradient approach (in this case 48 axes on a 7×7 neighborhood, with baseline geometric weighting), and then a 'token' application of channel and cross-gradient weighting with little optimization applied. The background clutter abates with the token weighting, but such weighting also affects the planet signals. Empirical testing is employed to balance these tradeoffs.

The present work stemmed from the inventor's earlier work based on simulations involving millisecond-scale speckles, 10 cm-scale Freid cells at the pupil of a 1 m telescope, and isoplanatic assumptions within a few arcseconds. An early goal was to detect a star-companion pair with contrast ratio approaching 1000:1 star to companion or 7.5 mv, and angular separation much less than the atmospheric seeing. Results of that work yielded sample noise-prone speckle frames, a 'morse transform' of a speckle image parsing out image gradients, and an eventual reconstruction of a $1000^{th}$ bright companion after 10K speckle frames.

The implementations represented in the computer program code listings filed with this application and related application 61/871,772 go beyond that original work.

The present technology is useful with both space and terrestrial telescopes (the latter typically including adaptive optics systems), and with exposures longer than the millisecond scale of the early work. Although the NAKFI data simulates a coronagraph, the present technology is also applicable to conventional telescopes. Applicant's technology is also useful in processing of medical images, by whatever means captured (e.g., x-ray, MRI, PET, thermography, ultrasound, tomography, etc.). For example, this technology is applicable to automated medical screening routines for the early diagnosis of various cancers.

A Deeper Dive

This disclosure references the very broad studies and algorithmic implementations associated with the name Markov, deriving from Andrey Markov the Russian mathematician who explored many facets of so-called stochastic processes. For the purists amongst us, the rather strict mathematical definitions that have since been developed, which then subsequently attach his name to that which has been defined, are certainly quite important to bear in mind in reading this disclosure. With the now-accepted phrase 'Markov Random Field.' not only is two dimensional 'pixel data' brought into the picture, but a certain broader set of 'possible dependencies' are also added into the theoretical framework, leaving the door open to how known or knowable such dependencies are or can be. The term 'hidden' has also been used to generally refer to degrees of known versus unknown dependencies in data and various groupings of identified datum. This disclosure wishes to be explicit in adding further connotations to what we mean by Markov Random Fields by pointing out that 'square pixel grids' of independently realized data (brightness values), where generally photons bombard photosites over some time-gated period and thus get measured, form a network of specific data relationships themselves. One pixel's value might be 60% of the time brighter than a pixel two over and one up from it, but yet a third pixel's value, one down and one over from the first, might be dimmer than the first pixel 48% of the time WHEN the second pixel is brighter than the first. The point of this somewhat silly example is to be quite clear that this disclosure is very liberally using the name 'Markov' to cover this bogglingly rich character of possible dependencies in 2 or more dimensional data grids. Herein lies part of the reason applicant believes these 'non-linear' methods have their merits over linear methods, in that a very weak 'planet' or 'single-cell anomaly' can often have its presence detected in these webs-of-dependencies in ways that linear methods tend to 'integrate into the noise.'

With that as preamble, consider the following treatment of the extremely-weak-signal-in-noise context:

Stage 1, Domain-Generic Markov-Multi-Axis Switches and Dials: Essentially all N-Dimensional empirical data share the property that there is some locality property of datum relationships, which may be regarded to fall to 'informationally zero' at some distance point. The classic word 'kernel' still nicely applies here. Every datum, pair of datum as a relationship, triads of datum, up to the full group of kernel data as a whole, all potentially contain information that can be plumbed toward one quest: is there evidence of the presence of an extremely weak signal inside this kernel, or no evidence. A digital watermarking variant on this quest includes the concept of polarity, or, make your best guess at the center of the kernel being up or down relative to the whole of the kernel. Attempt a quantification of confidence in the answer based on whatever information you believe might exist in the kernel-datum-relationships. Apply 'switches and dials' to all intra-kernel relationships one can think of: switches are 2 or more discrete states which certainly include decisions such as 'use algorithm X in these situations and algorithm Y is these other situations.'' A main point is that generic switches are simply discrete in number. Dials aren't discrete, generally applying to multiplication of interim relationship operations as well as resultant weighting based on the quantification of confidence. A near-universal description of these switches and dials describing kernel-datum relationships can be constructed, within a Markov-Multi-Axis rubric.

Stage 3, Domain-Generic Empirical and Theoretical Optimizing of Switches and Dials: Essentially all N-Dimensional empirical extremely weak signal detection problems share the same foundation of needing to separate true signal detection from false apparent signal detection. Each domain gives rise to some number 'S' of switches and 'D' of dials in stage 1. Each domain also can produce—via empirical means, theoretical means, or both—data sets which contain examples of extremely weak signals being both present and absent. Call these training sets. Each domain also has notions of successful detection, and metrics of success on those detections. These metrics also can be both discrete or continuous: 'this peak signal was the highest one detected and it corresponds to the correct choice' through 'aggregate correct signal levels are C versus aggregate false signal levels are F'. Given some training set, a big machine in the cloud can churn away flicking the switches and tuning the dials, maximizing the defined success metric(s).

Stage 2: Domain-Specific Choices of the Specific Switches and Dials, Training Sets, Success Metrics, and very often 'reasonable' starting points for s, d and rough importance factors on S and D:

The best case here is that stages 1 and 3 all have very large and useful libraries for S and D kernel definitions, search methods, starting S and D value suggestions, etc. Case studies provide examples for how certain S and D parameters have been successfully used and tuned. Each new domain may have new twists to add to that library. But in general, each domain will need talent within that domain to take a synoptic view of the whole process and make sure that the S and D factors of stage 1 are properly created and then aligned with the optimization engine of stage 3. Turning on the optimization engine will probably ALWAYS produce interesting results that a domain expert will wish to study, be surprised by, play with, learn from, etc. Iteration is a natural consequence.

From the foregoing philosophical foundation, consider the following, more practical implementation of these principles:

A grid of locations is established where the presence or absence of a very weak exoplanet light signal will be tested. Multiple pseudo-independent observational data sets provide for hundreds, thousands or even more tests for each and every candidate location. The resultant accumulation of tests can be displayed as an image of either one or more exoplanets present, or of certain edge features of proto-planetary disks.

The individual tests are some set of N discrete Markov comparisons producing an N-vector which can only hold a +1, −1 or 0 as a value, applied to some given data instance (e.g. a 30 second, single band exposure). Biases in these core comparison tests can often be estimated and mitigated during the comparison procedure. Each comparison can be individually weighted in a subsequent accumulation of values, e.g., by a) kernel-datum-dependent weighting factors and b) kernel-datum-independent factors.

The discrete number 'N' of distinct possible Markov relationships that can be tested is unlimited. As noted, there is generally an 'informational diminishing returns' point, however, where conjuring up further Markov tests produces no measurable increase in quality of end result. This point is intuitively connected to the classic use of the 'kernel' (and its size) in image processing. For adaptive-optic/coronagraphic exoplanet detection in particular, with its typical extended residual PSF energy of certainly a main star's light but also of a dim planet's light, this diminishing returns point may be elusive and subject to empirical discovery.

The weighting factors applied to the comparison vector datum can be conceived of as an M dimensional function with each axis of the M dimensions being defined by some local kernel data relationship representing the domain of that particular dimensional component. "Brightness of the central pixel." total brightness of the kernel, gradient magnitudes in and around the kernel, orientation of Markov tests to prevailing gradient directions . . . these and other local kernel data relationships are all candidates which might correlate to the information quality of some specific comparison test.

The 'range' of each individual axis in the M-dimensional weight space can be modeled by a Taylor-series (or equivalent) polynomial with a 'large value constant' asymptote value at some selected point, where such value is often zero but need not always be so. The common origin value for all M-dimensional axes is made up of a scalar value Ws, itself made up of multiplying several 'P' non-kernel-data-dependent factors. Examples of this origin value include a given pixel's s/n quality behavior, a given test's overall efficacy, a given band of light's overall ability to generate good detection, a given frame of data's 'atmospheric quietness', etc. The same diminishing returns argument applies to the ultimate discrete numbers M and P utilized in the vote weighting process.

The end result might be termed a kernel-constrained Random Markov-Field optimized filter for exoplanet detection. The filtered results can be submitted to further processes which incorporate more specific forms of PSF information or knowledge about speckle statistics which may not have been modeled inside Markov comparison operations. Such other routines may need to be modified due to the non-linear nature of the Markov filtering.

Figure 3:
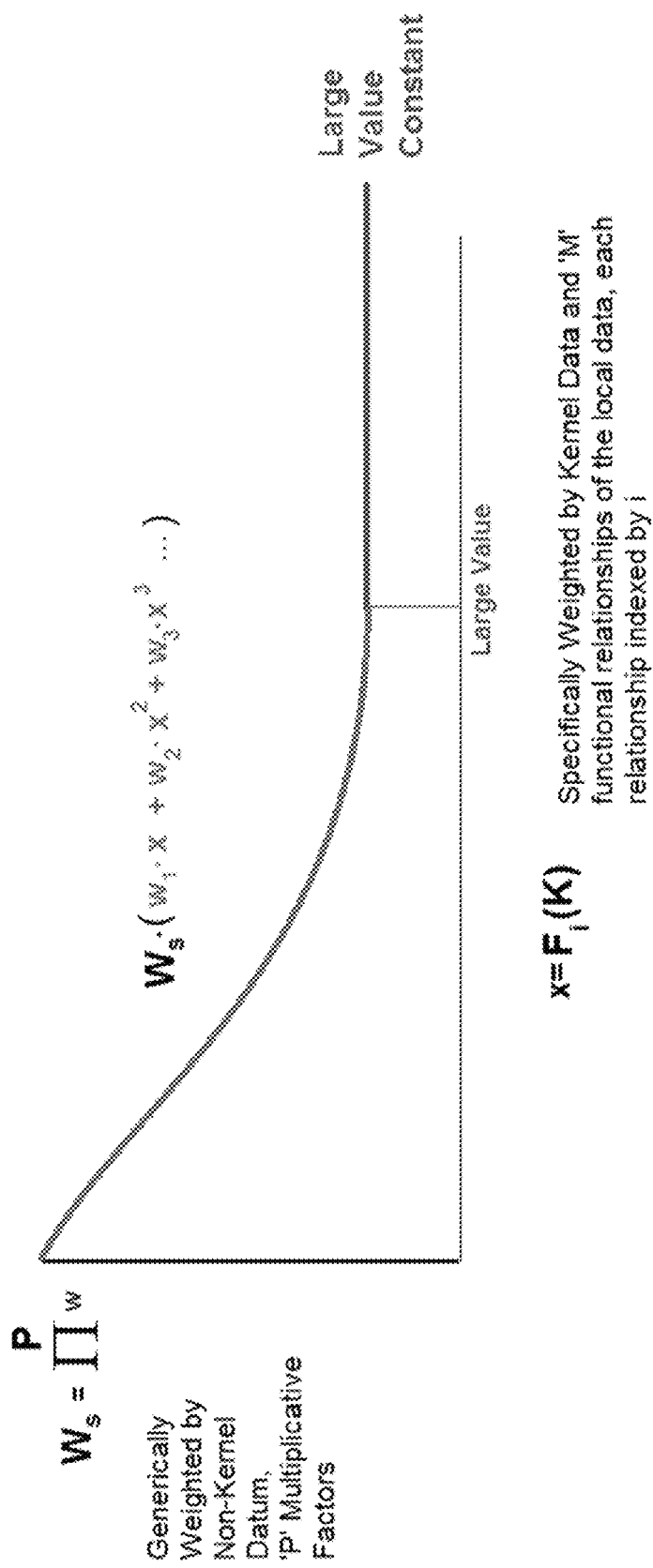
FIG. 3 depicts an empirically-tunable weighting function.

(FIG. 3 illustrates such a Taylor series weighting function. The shape of the function is parametrically established, with the parameters being empirically determined, and refined. For example, by applying the described techniques to "ground truth" imagery depicting known exoplanets, such weighting function can be tuned accordingly. By training/optimizing the weighting function based on "known good" image data, its utility for dealing with other, unknown image data, is enhanced.)

Rings and Freckles

The earlier example of a 7×7 pixel image patch considered just 48 votes, based on differences between the center pixel value and other pixel values. A much richer set of "votes," as to the presence or absence of a speck in imagery, can be achieved by considering concentric geometries, e.g., rings, around a center point.

An attached listing of experimental code, RingRing_RingSearchv10, employs this and other advanced methods. (This code is more obtuse than the other appended code, due to a variety of factors. For example, it includes various "commented-out" trial code, which is switched-in or switched-out depending on different experimental thrusts. The code is also adapted to idiosyncrasies of the particular input imagery used (which depicted the exoplanet-rich HR8799 star system). The code also uses "Matlab single statement" code optimization, which pre-packages many of the data arrays so as to optimize the use of Matlab array processing, ultimately heading towards use with the Matlab parallel processing toolkit. Despite such complexities, a sufficiently-skilled artisan will find the code both an instructive disclosure and implementation of the features involved.)

The following narrative discussion is drawn from another patent application which particularly concerns application of such concentric geometries to the problem of discerning weak digital watermark signals from imagery. (The reader is asked to forgive the repeated review of "oct-axis" filtering, and the tangent into 3D facial modeling, which are preserved to maintain the integrity of the original source material.) Applicability of the detailed methods to other weak signal contexts, such as detection of cancerous precursors and exoplanets, is evident.

The detailed approaches take advantage of what may be referred to as a "freckle" transform to compute local feature signatures for data sets comprising 2 or more dimensions of samples. Each sample may itself correspond to a single feature value or a vector of feature values at the sample location. For example, in the case of a color image, the sample locations correspond to pixel locations of a 2D color image sensor array, and the vector of feature values at each sample location are color component values, such as Red, Green, and Blue color values. For multi-spectral or "hyper spectral" imagery, each sample may correspond to a vector of spectral values corresponding to measurements obtained from spectral bands. The sample location is often but not necessarily a spatial location. The sample location may also have a time coordinate, such as the time of video frame in a sequence of video frames or audio sample captured in a microphone of a microphone array. Spatial locations may have one to three dimensions (X, Y, Z, coordinates, for example. These are just typical examples of coordinate systems for sample locations, and the locations may correspond to other coordinate systems. The freckle transform seeks to extract useful relationships among feature values of local groups of samples. Local, in this context, refers to the neighboring features in terms of distance from a particular location in the coordinate system. The freckle transform operates on feature values in a region around a sample of interest, which may be defined as a distance or particular area surrounding that sample. The transform produces an output vector describing a relationship among feature values in that region. As we will explain with examples, the region varies in shape and size with the application and may be adaptive. In particular, we have designed implementations of a freckle transform to provide a compact representation and efficiently computed vector or "signature" representing local relationships.

These local feature vectors are useful for a myriad applications, including, but not limited to weak signal detection, signal or object recognition, signal matching to track common features within two or more data sets (e.g., such as features captured from cameras at multiple locations and/or multiple capture times, etc.), machine learning, etc. We generalize the description of the transform as it may be extended to a variety of data types and signal processing applications.

In prior work, we have used particle versions of a freckle transform for signal detection (e.g., detecting weak signals representing planets in data sensed from telescopes, or detecting weak signals, such as digital watermarks in the presence of noise in audio or video captured with microphones or cameras). We coined the term "freckle transform" in connection with more recent extensions of the local feature extraction approach to multi-spectral image applications, such as produce (fruits and vegetable identification), and medical diagnostic applications, primarily for skin. In these latter applications, "freckle" refers to local differences on the surface of a fruit or human skin, and thus the name, "freckle." See related U.S. patent application Ser. No. 14/201,852, filed Mar. 8, 2014, which is hereby incorporated by reference.

Figure 4:
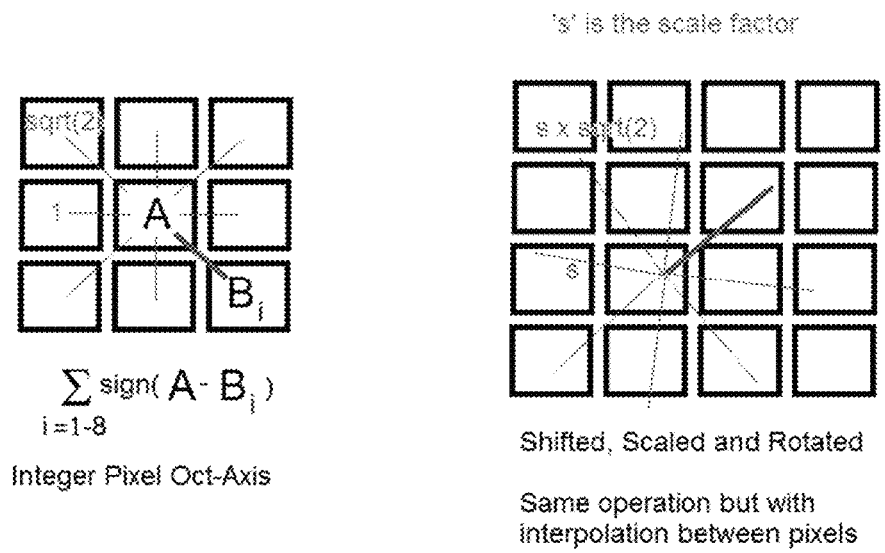
FIG. 4 is a diagram depicting a specific example of a local feature transform that applies an eight-axis filter approach ("oct-axis").

FIG. 4 is a diagram depicting a specific example of a local feature transform to introduce the technique. On the left of the diagram, there is a 3×3 block of samples, which may correspond to pixels of an image, for example. In this example of the transform, each sample is transformed by replacing it with the sum of differences between the sample value at the center sample, and the sample value at each of the eight neighboring samples. In other words, the transform applies a filter to each location of an array of locations in a coordinate space of interest. Other variations of the filter implementation are possible, such as by quantizing the output of the difference to a positive or negative value. For instance, this filter may be implemented as a sum of outputs of eight comparator operations, where the comparator output is +1 or −1.

Various alternative filter functions for extracting feature relationships may be efficiently implemented in a look up table configuration. In such a configuration, each comparison is input to the table, and the output is a transformed value corresponding to that input. This approach offers a computationally efficient approach for implementation in a digital logic circuit or software instructions. We sometimes refer to this approach as "oct-axis" where "oct" corresponds to the eight neighbors, and axis is the axis along with the neighboring sample is sampled. For more on this type of an approach, see U.S. Pat. Nos. 7,076,082 and 8,687,839, which are hereby incorporated by reference.

The right side of FIG. 4 depicts a generalization where the shift, rotation and scale of the oct-axis filter varies. As shown, a shift causes a spatial displacement, such that the center of the filter may no longer fall on an integer coordinate of the array being sampled. The rotation rotates the axes of the filter. The scale alters the distance from the center of the filter to the sampling location. Due to shift, rotation and scale, the sampling location may no longer fall on discrete coordinates of the array being sampled, and as such, the feature value is interpolated from feature values at neighboring locations. This generalization is useful for applications where there is a need to account for translation, rotation, and scale of the data. For example, this enables signal detection or recognition robust to translation, rotation and scale, as well as sub-sample detection accuracy.

Figure 5:
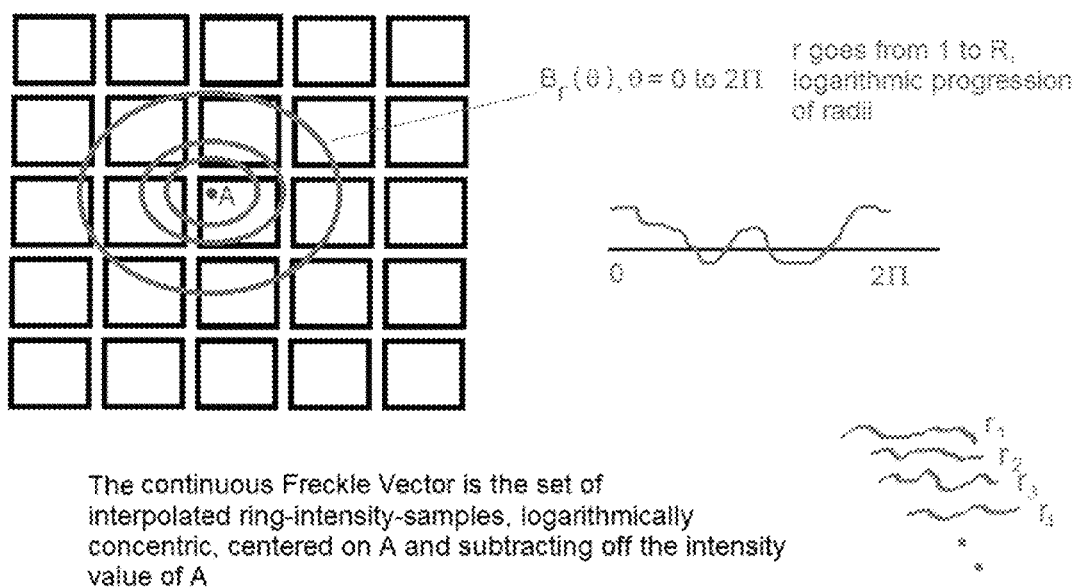
FIG. 5 is a diagram depicting a further extension of the filter of FIG. 4.

FIG. 5 is a diagram depicting a further extension of the filter of FIG. 4. In this case, the value A is the sampled value from the data array at the center sample location, and B now is the value of a neighboring feature along rings centered at the center sample location of feature A. The rings are logarithmically spaced apart in this example, but the spacing may vary according to other functions of the radius. The waveforms on the right side of FIG. 5 provide examples of values of B sampled along a ring, as the sample location is rotated from 0 to $2\pi$ along the ring at a given radius. This provides an illustration of how the relationship between the feature value at B varies relative to the feature value at A as a function of rotation angle (i.e. direction and distance of sample location relative to center location). The commentary in the diagram refers to the feature value as an intensity value, yet the particular quantity represented or measured at a feature location could correspond to other quantities.

In the more generalized form of FIG. 5, the transform provides a flexible method for representing relationships among local feature values at each location, A, where the local relationships are computed.

Figure 6:
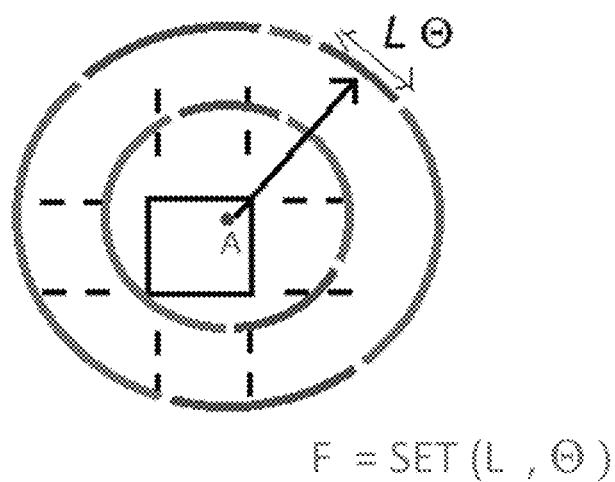
FIG. 6 is a diagram illustrating a local feature transform method that provides a compact representation of the transform.

FIG. 6 is a diagram illustrating a further extension of the method that provides a compact representation of the transform. This representation is particularly amenable to efficient representation in digital logic and software instructions, and makes it amenable to a wide array of signal recognition, classification and machine learning applications. In such applications, vast numbers of signals may be sampled (e.g., through various sensors) and local feature relationships extracted as useful discriminating features for signal classification, recognition and identification. In this configuration, the rings are broken into arcs corresponding to feature values (e.g., intensity values) that are above and below the feature value of A. Each has a "center direction" $\Theta$ and an arc length, L. The center direction is the direction of the ray from the location of A to the center of the arc. The set of all segments (for each ring at given radius) and each of their two components, Θ and L, constitute the vector output of the transform for each location of A. The first and higher order derivatives of the ring feature value profile can also be calculated, segmented into two component arcs, and added to a composite vector for each location of A.

Figure 7:
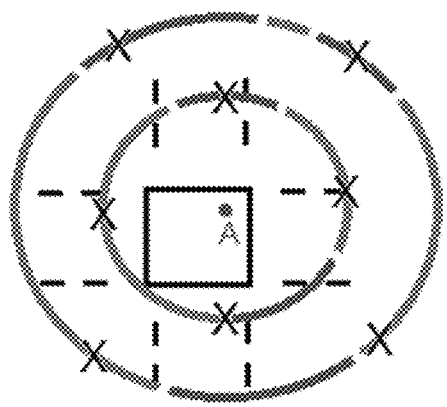
FIG. 7 is a diagram illustrating how the oct-axis filter approach of FIG. 4 fits within the framework of the ring and arc approach of FIG. 6.

Connecting the approaches of FIGS. 4 and 6, FIG. 7 is a diagram illustrating how the oct-axis filter fits within the framework of the ring and arc approach of FIG. 6. The oct axis approach samples two rings at 8 discrete points. Four of the points are at a ring with radius 1 and four are at a ring at a radius of $2\sqrt{2}$.

Figure 8:
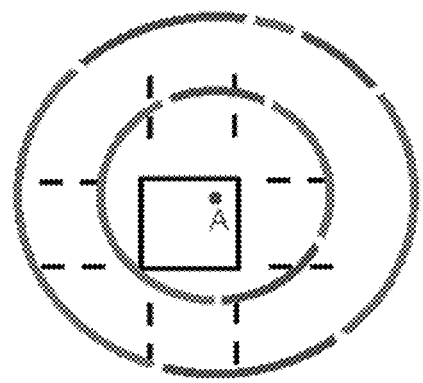
FIG. 8 is a diagram illustrating another variant of a local feature transform.

FIG. 8 is a diagram illustrating another variant. In this example, the output of the transform for each sample point A is a value computed by summing the difference between feature values at A and B, where B is sampled along each of at least two rings, and a weighting factor is included to allow different weights to be applied to the sums of different rings.

Figure 9:
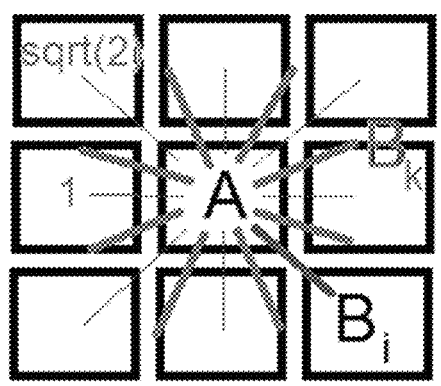
FIG. 9 is a diagram illustrating another variant of a local feature transform.

FIG. 9 is a diagram illustrating yet another variant. This example includes the discrete sampling of the oct axis filter of FIG. 1, and adds 8 more samples at a radius of 1.25.

Figure 10:
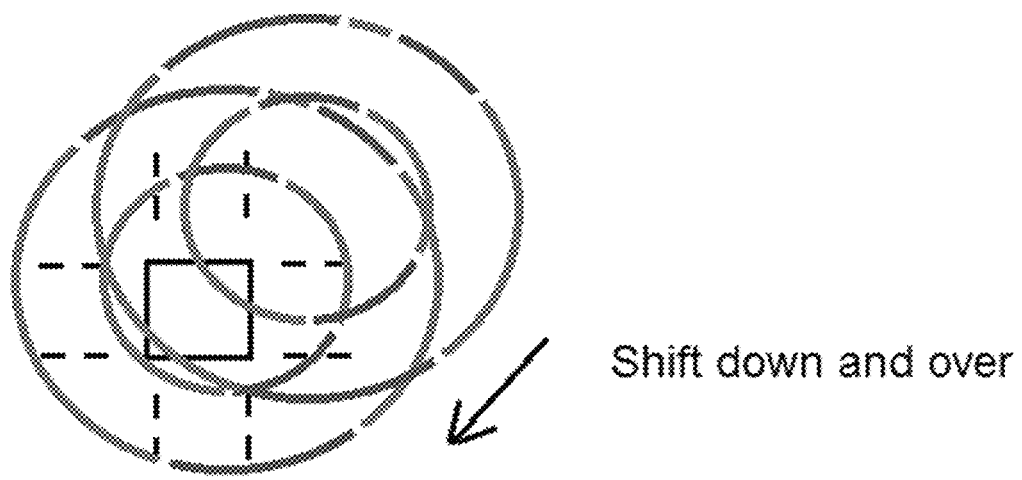
FIG. 10 illustrates an example of how the local feature vector may be used for local shift matching between corresponding features in images or other data sets.
Figure 11:
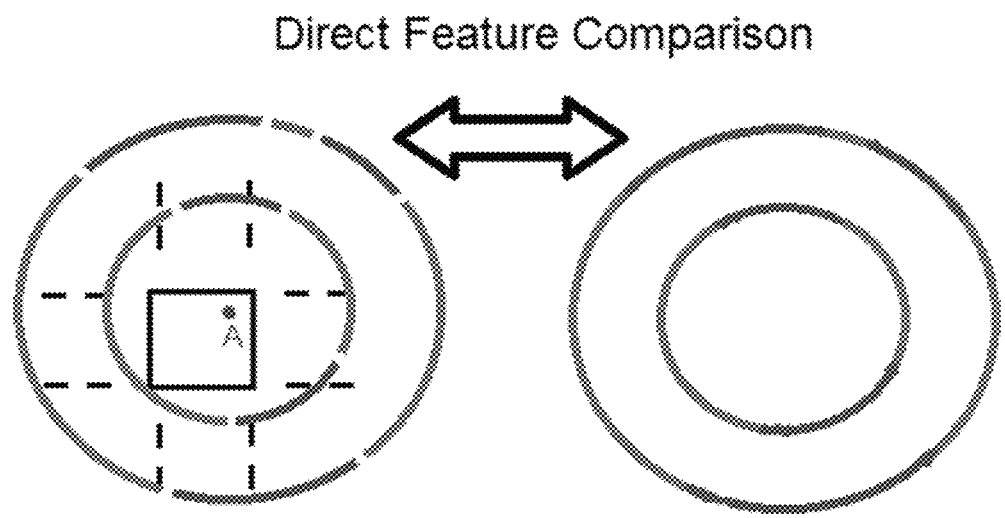
FIG. 11 illustrates use of local feature vectors for direct feature comparison.

FIGS. 10-11 are diagrams depicting a local feature vector to illustrate its use in applications. FIG. 10 illustrates an example of how the local feature vector may be used for local shift matching between corresponding features in images or other data sets. This approach may be used to measure spatial shift of corresponding features in image frames captured by a single camera at different times or different cameras at the same time (e.g., in stereo correspondence for example). These operations have application in weak signal detection, obtaining 3D structure from motion, registration or alignment of signals to each other, or to a reference signal, etc.

FIG. 11 illustrates use of local feature vectors for direct feature comparison. This may be used to determine relationship between features in different images or other sensed data sets. For example, one embodiment uses this direct feature for weak signal detection (namely, of sensor data from telescopes for exoplanet detection, in which the signal corresponding to an exoplanet is extremely weak relative to the dominant energy sensed from the nearby star). In this approach, each frame sensor data is transformed with the feature vector transform. Next, each transformed frame, comprising feature vectors, is selected to be the primary frame, in which the signal detection method then seeks to determine whether there is a signal signature corresponding to an exoplanet at location A. All other frames act as bias estimators.

There are many applications of the feature vector transform. In one application noted above, the local feature vector is well suited for capturing the unique spatial "freckles" on various fruits and produce. See, for example, U.S. patent application Ser. No. 14/201,852, incorporated above.

The feature vector transform provides for sampling of sensed data (e.g., images, multi-band spectral images, object ID sensor input) that is tuned to textures. The calculation of the values along the rings need not only be done with interpolation kernels. Any type of filtering can be used, including ones tuned for specific textures or patterns. The value of the outputs of these kernels then produce ring-arc vectors.

This feature vector formulation is well suited for handling scaled and rotated features. Rotations are phase shifts in the ring representation. Scaling corresponds to shifts between radii components of the overall ring-arc feature vector.

In object identification applications, and machine learning more generally, a single sample of an object generates a family of training vectors with different rotations and scales. This approach enables unknown object testing to tolerate any rotation of an object as well as different distances and/or different sizes of objects of similar type.

Many feature vectors accumulated in a given area likely share common rotation and scale properties, allowing further options in terms of recognition certainty and distance to object measurements.

The feature vector is well suited for applications involving micro texture analysis. For example, in computer aided medical diagnostics, micro textures are analyzed to determine if they correspond to particular diseases or anomalies.

Figure 12:
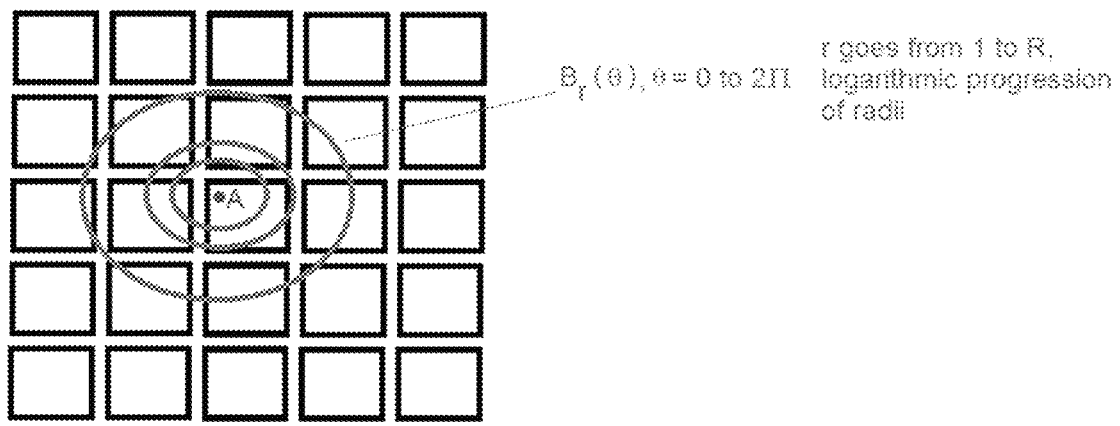
FIG. 12 is a diagram illustrating a generalized version of a feature vector transform.

FIG. 12 is a diagram illustrating a generalized version of a freckle transform. This approach retains the log-ring sampling. B becomes a vector field, and the production of vector values of B correspond to any known kernel or transform of sample arrays, such as FFTs or wavelets. This formulation of the transform provides adjustable parameters that can be adjusted for training a classifier: these parameters include selection of R and radii, discrete spacing, approaches for transforming continuous ring vectors into arc vectors, and selection of the function or transform for producing the B-vector.

One embodiment is designed for determining surface topology of an object in a scenario where a user waves a camera over the object. For instance, in an application of our methods for determining 3D surface topology of a face, the methods derive the 3D topology from selected image frames captured when a user waves a smartphone camera over his face. The target corresponds to an object (including the surface area of interest of an object, e.g., the skin on a face) about 3 to 6 inches away from a handheld. The methodology of this embodiment also applies to closer and further objects. A particularly useful application is discerning surface topology of the skin and the face.

Figure 13:
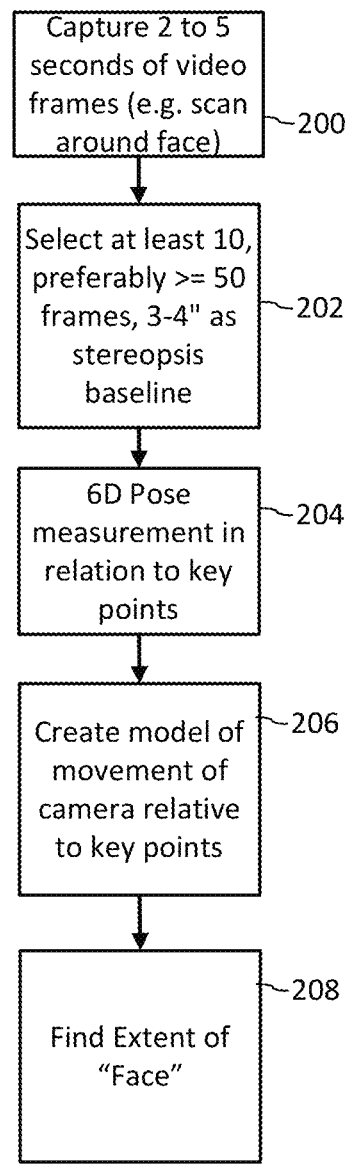
FIGS. 13-16 are exemplary flowcharts.
Figure 14:
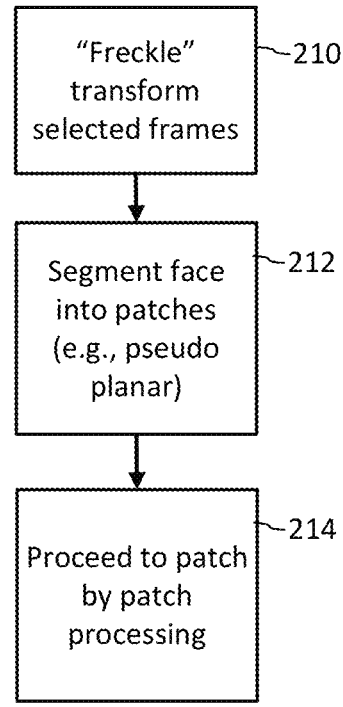
Figure 15:
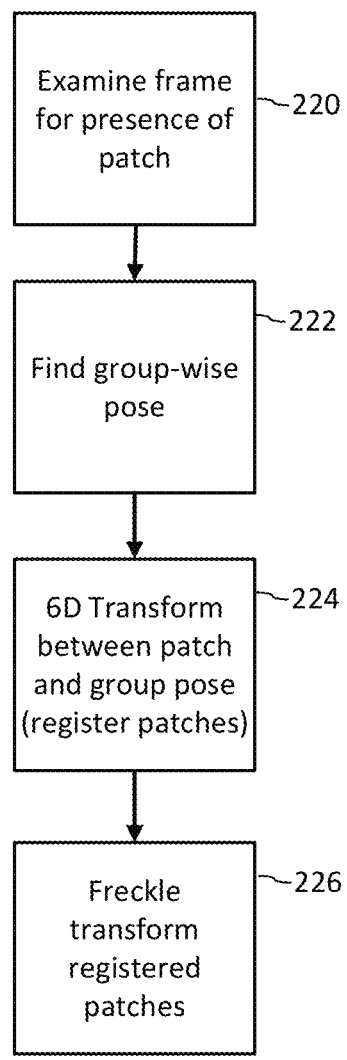
Figure 16:
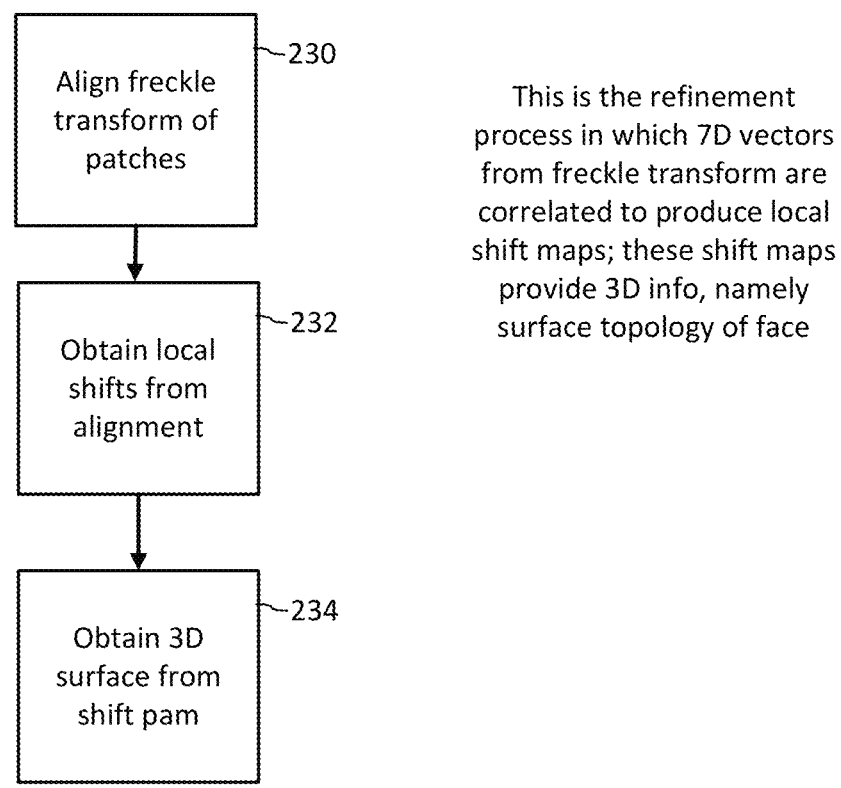

FIG. 13 is a flow diagram depicting initial stages of collecting and selecting video frames, and deriving pose from them.

Users are taught to 'scan around their face' with the camera of smartphone for 2 to 5 seconds. The motion is meant to create at least 10 if not >=50 'frames' which are largely in focus but providing horizontal and vertical stereopsis baselines of at least 2 to 3 inches as a full group, maybe even 4 inches (lateral movement across and up/down). The first task is to select frames mainly based on focus. Gyro and accelerometer data is also captured, and synchronized to image frames. The image data is collected without compression (e.g., no JPEG transform of the frame). The effects of rolling shutter are dealt with late in the process.

The selected frames are initially subjected to a first stage of 6D pose measurement, in relationship to key points on the face. Eventually, a sub-millimeter (but not quite single digit micron) level 'model' of the movement of the camera relative to the key points on the face is created. Several alternative models may be used as appropriate for the nature of the target. See, e.g., Gonzalez-Mora, J., De La Torre, F.; Z., Guil, N.; Zapata, E. Learning a generic 3D face model from 2D image databases using incremental structure from motion, Image Vision Comput. 28(7):1117-1129 (2010), which is hereby incorporated by reference.

The model in question has both the 6D pose track of the selected frames and the key-point 3D model of the face. The 'extent of the face' is then found, in which sub-millimeter topometry is applied. In parallel, all selected frames are freckle transformed into same-pixel-grid 7 dimensional vectors, representing non-linear near-mid and far gradient vectors. We refer to these as 7D freckle transform vectors.

Next, the face model is segmented into 4 by 4 or even up to 16 by 16 'patches' having coarsely defined 'pseudo planar' attributes, with the nose perhaps being more finely 'tessellated'.

Up until the final stage of putting the separately obtained 3D data from each patch, the next few steps are done on the patches. Patch by patch, the selected frames are examined for their reasonableness in containing the given patch, by a 35 degree to 40 degree limit on camera-plane to patch-plane criteria. Typically, one quarter to one half of all selected frames will contain contributing data for the patch. A border is applied to image data surrounding the patch, and image data are gathered up from the selected frames.

Next, a 'full patch' 6D pose registration of all the patches to each other is computed. Basically, in this process, a cross-group registration is performed which 'fixes' the face patch in question, and finds a fairly precise (sub-millimeter) 6D relationship of the camera to the patch for each and every selected image. This process is seeded by the global model already calculated, but here refined for the patch in question. A median of the individual 6D pose models of the patches is computed to find a group-wide pose. Then, each patch-image is 6D pose (affine) transformed to this group-wide pose, utilizing 2D image interpolation routines. If one were now to cycle-view these patches, one would find that they are quite nicely registered but not to an extreme. The differences between images is precisely where the stereopsis comes into play. There are differences due to other effects, such as "glint," which we explain later.

These well-registered patches are now freckle transformed again. Their earlier freckle transforms were used in higher level 'model' building and registration. The detailed stereopsis—image shift—operations have a new stage of freckle transform applied to the patches after they are pose transformed.

An initial coarse 3D model of the patch is then computed. This initial coarse 3D model, seeds a refinement routine in which the individual freckle transform vectors in each of the patch-frames are correlation aligned with each other, generally in the 10 to 20 pixel kernel range. In one implementation, the correlation is performed using a FFT: compute FFT of corresponding blocks of Freckle vectors, multiply, and obtain shift corresponding to correlation peak. This is akin to phase correlation between corresponding 32 by 32 or 16 by 16 pixel blocks. In this case, we are working with 7D vector shift-correlation, however. Careful attention is paid to doing more than simple dot-product correlation. The 'angle between vectors' also comes into play mainly by modifying the dot products curing correlation. Experiments have shown that for greater than 2D vector correlation in general, the basic well known dot product can be improved upon, further exploiting the 7D nature of freckle vectors. Another detail here is that the ultimate stereopsis shift-matching can either be done on a pairwise image to image basis, or, all images can be produce a 'shared freckle master patch' and then each image is compared to this master. Either way, the 10×10 to 20×20 pixel small regions are correlation shifted to find a maximum, and the shift ultimately relates to distance as per common stereopsis/parallax principles. Each creates its own 'local shift map' in much the same ways that our own two-eyeball vision does so. At this point, the sub-millimeter and even 2 digit micron level topology of the skin manifests itself as specific shifts depending on where the camera was for each of the image-captures. A shift for each patch is computed: a bit left of the patch, a bit up from the patch, etc. The topology of the skin or generic surface will produce one pixel shifts or more for more topographically obvious surfaces, and sub-pixel shifts for more subtle features such as minor wrinkles, stuble, etc. By collecting data from at least ten different vantage points and with nice baselines both horizontally and vertically, the depth resolution of the resultant 3D map may be improved, e.g., depth resolution to 100 microns.

Concluding Remarks

The processing of data from neighborhoods of pixels is familiar in various digital image processing applications. For example, in the context of extracting digital watermark information from imagery, and in characterizing image sensors, such techniques are illustrated by Digimarc's U.S. Pat. Nos. 6,483,927, 6,580,809, 6,590,996, 7,231,061, and in published patent applications 20100325117 and 20100165158.

The inventor's previous work on astronomical imaging is detailed in U.S. Pat. Nos. 8,023,117, 6,762,400, 6,726,339, and 6,429,415. The imaging instruments detailed in such patents are suitable for gathering image information that can be processed by the presently-described arrangements. Interferometric instruments are particularly well suited for gathering exoplanet image data.

Reference was made to the Tatarskii/Wheelon Channel Model (c.f., Tatarskii, The Effects of the Turbulent Atmosphere on Wave Propagation, Springfield: Vistas Astron., 1971; and Wheelon, Electromagnetic Scintillation. I. Geometrical Optics, Cambridge: Cambridge Univ. Press, 2001). This refinement exploits the atmospheric effects to good purpose (i.e., making this enemy a friend).

Reference was also made to speckle imaging, and atmospheric seeing. Wikipedia articles for these topics are attached in the previous applications. Also so-attached are Wikipedia articles for adaptive optics, and Shack-Hartmann wavefront sensors. The artisan is presumed to be familiar with these disciplines.

It will be recognized that spectral analysis of light from exoplanets may reveal biosignatures indicating Earth-like life.

Biosignatures are spectral evidence of chemicals on the exoplanet surface—or in its atmosphere—that are associated with life. For example, if an exoplanet is an earth twin, it will evidence biosignatures of oxygen (most commonly produced by plants and photosynthetic bacteria) and ozone (an atmospheric by-product of oxygen). Other such biosignatures include water vapor (typically indicative of liquid water), nitrous oxide (a biological by-product), and methane (which is commonly produced biologically, but may also have volcanic origins).

The appended Matlab files presume a familiarity with Matlab—a skill in which artisans in the exoplanet imaging field are well versed. From such code, the artisan can understand and practice applicant's methods—using both the simulated NAKFI data and real image data.

Similarly, such code teaches the artisan how such methods can be applied in detecting cancerous pre-cursors from medical imagery.

While the detailed methods, and code, operate on 2-D data, the same principles likewise apply to 3-D or greater data. For example, in analyzing 3D medical imagery, the 7×7 analysis technique can be straightforwardly-changed to a 7×7×7 analysis technique (i.e., with 342 gradients contributing to the processed value of each voxel, instead of 48 gradients). Etc.

Looking further, it is possible to combine adaptive filtering of the sort employed herein (e.g., setting the weights on the non-linear filter coefficients) with machine learning applications, and image classification. In connection with such an arrangement see, e.g., Masood et al, Machine Learning and Directional Switching Median-Based Filter for Highly Corrupted Images, Knowledge and Information Systems, Vol. 36, No. 3, September, 2013, pp. 557-577 (attached to application 61/871,772). Machine learning can be used to characterize (recognize) the noise and then adapt the non-linear filtering that is applied to the signal.

Further concerning use of non-linear filters for medical diagnostics, the 2011 thesis by Nagi entitled "The Application of Image Processing and Machine Learning Techniques for Detection and Classification of Cancerous Tissues in Digital Mammograms," Univ. of Malaya, Kuala Lumpur (attached to application 61/871,772), examines many non-linear filter types used to process images for cancer detection. This document, and references cited therein, provide additional insight into application of adaptive non-linear filtering to analysis of cancer images.

More generally, inspection of the referenced Matlab code will show that there are a multitude of parameters that may be adjusted to optimize detection of weak features in noisy images. These parameters may be viewed as comprising a multi-dimensional vector that can be varied over many values.

In a large set of images—some with an anomaly to be detected (e.g., a cancer, or a planet), and others without—the vector can be empirically adjusted through its space to find what parameter values yield optimal detection results. (The input images may have different classes of features to be detected, e.g., a star with one exoplanet; a star with two exoplanets, etc., and different optimizations of the vector may be discovered for these different image classes.)

The Extrasolar Planets Encyclopedia (exoplanet<dot>eu) currently lists 1815 known exoplanets (up from 927 a year earlier). Hundreds, or thousands, of images have been captured from each of these star systems, probably yielding in excess of a million images that can serve as positive ground truth examples for training such a classification system. There is a comparably large (or larger) known set of stars that are confidently believed not to have any orbiting bodies of planetary mass, which can serve as counter-examples. While manual trial-and-error adjustment of these parameters, informed by seat-of-the-pants judgment, can yield good results, better results are believed attainable by such a systematic exploration of the parameter space, using such reference imagery. (Ideally, a set of reference imagery used in such an exercise is all derived from the same telescope, or from telescopes that exhibit similar performance, noise artifacts, etc. Thus, different parameters may be derived for different instruments.)

As is familiar, the appended Matlab code runs on computers, running the Matlab computing environment. Such computers typically include one or more processors, one or more memories (e.g. RAM), storage (e.g., a disk or flash memory), a user interface (which may include, e.g., input devices such as a keyboard and a telescope's imaging and wavefront sensors, and output devices such as a screen, together with software instructions for providing a graphical user interface), interconnections between these elements (e.g., buses), and an interface for communicating with other devices.

As exemplified by the Matlab code, applicant's methods can be implemented as instructions for computing devices. In different embodiments, these instructions may be implemented as other types of software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data may also be distributed among different processor and memory devices. GPU-based image processors are well-suited for the sorts of image processing required by the present technology. Cloud computing resources can be used as well.

Software and hardware configuration data/instructions are commonly stored as instructions in one or more data structures conveyed by tangible media, such as magnetic or optical discs, memory cards, ROM, etc., which may be accessed across a network.

This specification references a great diversity of technology. It should be understood that applicant's technology can advantageously be employed in conjunction with the other technologies referenced herein—further extending their capabilities. Moreover, it will be recognized that the detailed technologies can be included with other technologies—current and upcoming—to advantageous effect. Implementation of such combinations is straightforward to the artisan from the teachings provided in this disclosure.

Sub-combinations of the detailed arrangements are also separately contemplated (e.g., omitting various of the features of a complete system).

While aspects of the technology have been described by reference to illustrative techniques, it will be recognized that apparatuses configured to perform such techniques are also contemplated as part of applicant's inventive work. Similarly, non-transitory tangible computer readable media containing instructions for configuring a processor or other programmable system to perform such methods is also expressly contemplated.

The present specification should be read in the context of the cited references. (The reader is presumed to be familiar with such prior work.) Those references disclose technologies and teachings that applicant intends be incorporated into embodiments of the present technology, and into which the technologies and teachings detailed herein be incorporated.

To provide a comprehensive disclosure, while complying with the statutory requirement of conciseness, applicant incorporates-by-reference each of the documents referenced herein (except application 61/874,790)—including in the appended materials. (Such materials are incorporated in their entireties, even if cited above in connection with specific of their teachings.) The reader is presumed to be at least generally familiar with such prior work.

The invention claimed is:

1. A method of processing image data to aid in discerning patterns therein, the method being performed by a hardware image processing device and including the acts:
   (a) defining a block of N rows and N columns of pixel data, from a larger set of image data, where N is at least five, the block thereby comprising at least 25 pixel locations;
   (b) identifying plural gradient values from said block, each of said values comprising a difference between a pixel value at a center location of the block, and a pixel value at another location in said block, each of said gradient values being characterized by a magnitude;
   (c) identifying a first gradient value having a largest magnitude in said block;
   (d) assigning different weighting factors to different of said gradient values, wherein by reason of the first gradient value having the largest magnitude in said block, the first gradient value is assigned a first weighting factor that is the smallest of said different weighting factors;

(e) weighting each of said plural gradient values by the weighting factor assigned thereto, yielding plural weighted gradient values;

(f) combining data corresponding to each of the plural weighted gradient values, and, based on said combined data, establishing a value of a pixel in an output image, at a position corresponding to said center pixel; and (g) repeating acts (b)-(f) for other N×N blocks of pixel data in said larger set, to thereby yield an output image from which certain patterns may more easily be discerned.

2. The method of claim 1 in which:

each of said gradient values is characterized by a respective orientation angle, the first gradient value being characterized by a first orientation angle; and wherein said first weighting factor is also assigned to weight one or more other gradient values having an orientation angle that is parallel to said first orientation angle.

3. The method of claim 1 that further includes:

identifying second, third and fourth gradients of descending magnitude in said block, wherein a magnitude of the second gradient value is less than the magnitude of the first gradient value, a magnitude of the third gradient value is less than the magnitude of the second gradient value, and a magnitude of the fourth gradient value is less than the magnitude of the third gradient value; and by reason of the descending values of said second, third and fourth gradient values, respectively assigning second, third and fourth weighting factors of ascending values to said gradient values, wherein the second weighting factor is greater than the first weighting factor, the third weighting factor is greater than the second weighting factor, and the fourth weighting factor is greater than the third weighting factor.

4. The method of claim 1 that includes performing the method using an image processing device employing one or more GPU processors.

5. The method of claim 1 in which the larger set of image data comprises medical imaging data captured from a human subject.

6. The method of claim 1 in which the set of image data comprises plural image frames, wherein acts (a)-(g) are performed for each of the image frames, and thereafter combined to yield the output image.

7. The method of claim 1 that further includes:

identifying a further gradient value having a smallest magnitude in said block; and by reason of said further gradient value having the smallest magnitude in the block, assigning to said further gradient value a weighting factor that is the largest of said different weighting factors.

8. A method of processing image data to aid in discerning patterns therein, the method being performed by a hardware image processing device and including the acts:

(a) defining a block of N rows and N columns of pixel data, from a larger set of image data, where N is at least five, the block thereby comprising at least 25 pixel locations;

(b) identifying plural gradient values from said block, each of said values comprising a difference between a pixel value at a center location of the block, and a pixel value at another location in said block, each of said gradient values being characterized by a magnitude;

(c) identifying a first gradient value having a smallest magnitude in said block;

(d) assigning different weighting factors to different of said gradient values, wherein by reason of the first gradient value having the smallest magnitude in said block, the first gradient value is assigned a first weighting factor that is the largest of said different weighting factors;

(e) weighting each of said gradient values by the weighting factor assigned thereto, yielding plural weighted gradient values;

(f) combining data corresponding to each of said plural weighted gradient values, and, based on said combined data, establishing a value of a pixel in an output image, at a position corresponding to said center pixel; and (g) repeating acts (b)-(f) for other N×N blocks of pixel data in said larger set, to thereby yield an output image from which certain patterns may more easily be discerned.

9. The method of claim 8 in which:

each of said gradient values is characterized by a respective orientation angle, the first gradient value being characterized by a first orientation angle; and wherein said first weighting factor is also assigned to weight one or more other gradient values having an orientation angle that is parallel to said first orientation angle.

10. The method of claim 8 that further includes:

identifying second, third and fourth gradients of ascending magnitude in said block, wherein a magnitude of second gradient value is greater than the magnitude of the first gradient value, a magnitude of the third gradient value is greater than the magnitude of the second gradient value, and a magnitude of the fourth gradient value is greater than the magnitude of the third gradient value; and by reason of the ascending values of said second, third and fourth gradient values, respectively assigning second, third and fourth weighting factors of descending values to said gradient values, wherein the second weighting factor is less than the first weighting factor, the third weighting factor is less than the second weighting factor, and the fourth weighting factor is less than the third weighting factor.

11. The method of claim 8 in which the larger set of image data comprises medical imaging data captured from a human subject.

12. The method of claim 8 in which the set of image data comprises plural image frames, wherein acts (a)-(g) are performed for each of the image frames, and thereafter combined to yield the output image.

13. A method of processing image data to aid in discerning patterns therein, the method being performed by a hardware image processing device and including the acts:

(a) defining a block of N rows and N columns of pixel data, from a larger set of image data, where N is at least five, the block thereby comprising at least 25 pixel locations;

(b) identifying plural gradient values from said block, each of said values comprising a difference between a pixel value at a center location of the block, and a pixel value at another location in said block, each of said gradient values being characterized by a magnitude, the block including first, second, third and fourth gradient values of ascending magnitudes;

(c) assigning different weighting factors to different of said gradient values, wherein by reason of the first through fourth gradient values having ascending magnitudes, first through fourth weighting factors respectively assigned thereto have descending magnitudes;

(d) weighting each of said gradient values by the weighting factor assigned thereto, yielding plural weighted gradient values;

(e) combining data corresponding to each of said plural weighted gradient values, and, based on said combined data, establishing a value of a pixel in an output image, at a position corresponding to said center pixel; and (f) repeating acts (b)-(e) for other N×N blocks of pixel data in said larger set, to thereby yield an output image from which certain patterns may more easily be discerned.

14. The method of claim 13 in which:

each of said gradient values is characterized by a respective orientation angle, the first gradient value being characterized by a first orientation angle and the fourth gradient value being characterized by a fourth orientation angle; and wherein said first weighting factor is also assigned to weight one or more other gradient values having an orientation angle that is parallel to said first orientation angle, and said fourth weighting factor is also assigned to weight one or more other gradient values having an orientation angle that is parallel to said fourth orientation angle.

15. The method of claim 13 in which the larger set of image data comprises medical imaging data captured from a human subject.

16. The method of claim 13 in which the set of image data comprises plural image frames, wherein acts (a)-(f) are performed for each of the image frames, and thereafter combined to yield the output image.

17. A method of processing image data to aid in discerning patterns therein, the method being performed by a hardware image processing device and including the acts:

(a) defining a block of N rows and N columns of pixel data, from a larger set of image data, where N is at least five, the block thereby comprising at least 25 pixel locations;

(b) determining an orientation through the block along which pixels show a greatest variation in values;

(c) identifying plural gradient values from said block, each of said values comprising a difference between a pixel value at a center location of the block, and a pixel value at another location in said block, each of said gradient values being characterized by a magnitude and an angle;

(d) assigning different weighting factors to different of said gradient values, wherein gradient values that are characterized by angles parallel to said determined orientation are assigned the smallest of said different weighting factors, by reason of being characterized by angles parallel to said determined orientation;

(e) weighting each of said gradient values by the weighting factor assigned thereto, yielding plural weighted gradient values;

(f) combining data corresponding to each of said plural weighted gradient values, and, based on said combined data, establishing a value of a pixel in an output image, at a position corresponding to said center pixel; and (g) repeating acts (b)-(f) for other N×N blocks of pixel data in said larger set, to thereby yield an output image from which certain patterns may more easily be discerned.

* * * * *